June 1, 1926.
J. R. WINTER
DISK FOR VEHICLE WHEELS
Filed Dec. 8, 1920
1,586,726
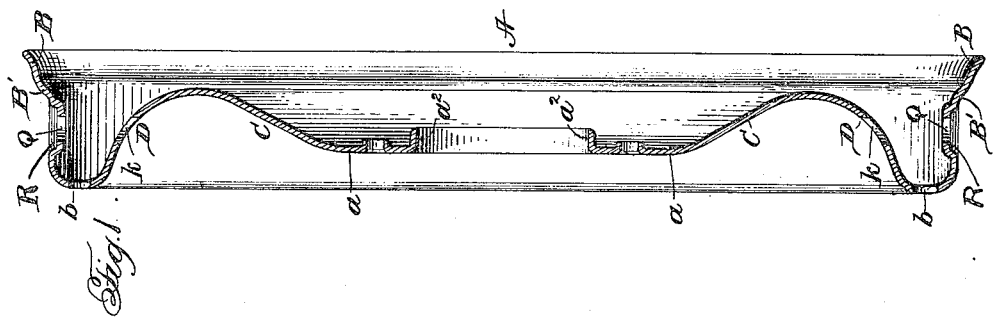
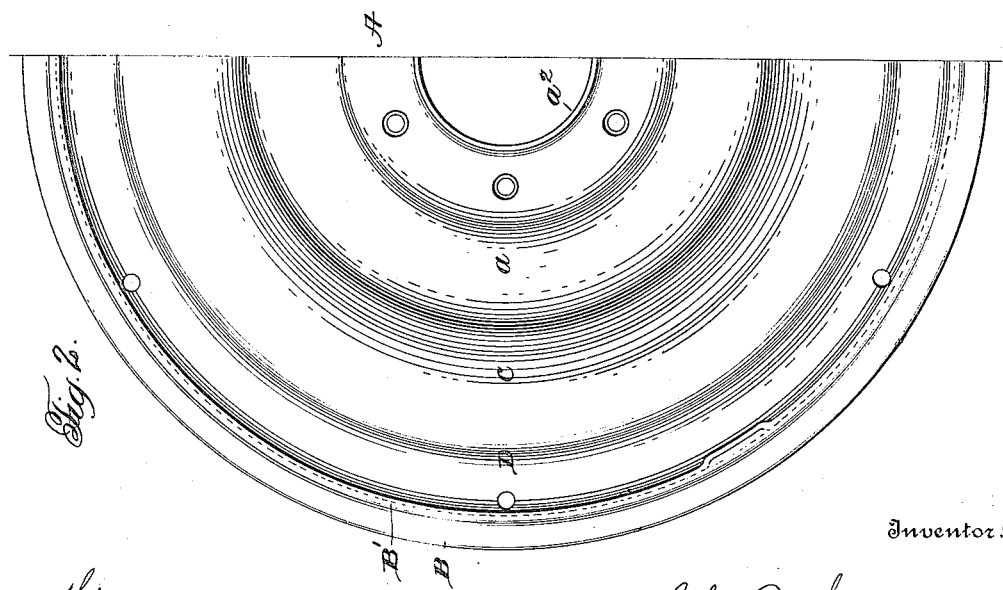
Witness:
Jas E. Hutchinson
Inventor:
John R. Winter,
By Clark C. Wood.
Attorney

Patented June 1, 1926.

1,586,726

UNITED STATES PATENT OFFICE.

JOHN R. WINTER, OF LANSING, MICHIGAN, ASSIGNOR TO MOTOR WHEEL CORPORATION, OF LANSING, MICHIGAN, A CORPORATION OF MICHIGAN.

DISK FOR VEHICLE WHEELS.

Application filed December 8, 1920. Serial No. 429,111.

This invention relates to improvements in vehicle wheels of the metal disk type.

The invention has for its object to provide an improved disk wheel that will have greater resiliency, and to provide a light, strong serviceable structure that can be cheaply produced.

The invention, with other objects and advantages thereof, and the particular construction, combination and arrangement of parts comprising the same, will be understood from the following detail description, when considered in connection with the accompanying drawing forming part hereof and illustrating one embodiment of the invention.

In the drawings:—

Figure 1 is a section of a wheel constructed in accordance with the present invention.

Figure 2 is a side elevation taken from the outer side of the wheel, one half of the wheel being shown.

While in the drawings I have illustrated a specific embodiment of the invention, it will of course be understood that minor changes and variations in the particular construction shown and the embodiment of the invention in other forms, as will appeal to those skilled in the art, and falling within the scope of the appended claims, may be practiced without departing from the spirit of the invention.

The particular construction illustrated in the drawings comprises a disk A having an inner central flat part $a$ provided with a laterally extending flange $a^2$, and adapted to be secured to the conventional types of hubs, (not shown). The flange $a^2$ may, however, be omitted if not required for the particular style of hub with which the disk is to be used. The disk has a substantially flat radially extending outer part $b$ and a central flat part $a$. Between the parts $b$ and $a$ the disk is provided with annular, concentric, axially extending reverse curved portions C, D. The disk A at its periphery is provided with an annular rim B, the latter having a rim supporting flange B' at one side, adapted to receive any standard form of removable rim. It will be understood, however, that the exact form of the rim B, may be modified so as to be adapted to any approved type of removable rim, or to receive a tire directly upon it. The outer curved part D of the disk and the annular rim B join the outer flat radially extending part $b$ in gradual curves, as shown, the structure being substantially free from sharp bends or angles.

The structure hereinbefore described, including the disk A, rim B and its tire-supporting flange B' is in the form of a single unit or wheel member, being constructed, by stamping or the like, from a continuous or single sheet of metal. Any suitable form of detachable tire-supporting rim (not shown) is adapted to be employed with the wheel member.

An opening Q is formed in the rim B and continued through the curve as shown at $k$ adapted to receive the valve tube of the tire so as to make the tube accessible for inflating the tire from the outside of the wheel.

A depression R is also formed in the rim B surrounding the opening Q to receive the nut commonly employed on the valve and prevent its projection beyond the outer surface of the rim B.

It will be noted that the particular disk structure with the special reverse curved portions will afford great resiliency, while at the same time the structure is of a light, strong nature, and can be manufactured at a little expense.

What I claim is:—

1. A disk wheel member constructed from a single sheet of metal and having an inner flat radially extending central hub attaching part, and annular axially extending inner and outer reversed curved portions between said flat central part and its periphery, the inner curved portion directly adjoining said central part extending to one side of the plane thereof, and the other outer curved portion being of greater curvature than said inner curved portion and extending therefrom to the other side of the plane of said central part, the disk being provided at its periphery with an annular rim crossing the plane of said central part and having a tire supporting flange at one side thereof.

2. A disk wheel member constructed from a single sheet of metal and having an inner flat radially extending central hub attaching part, a flat radially extending peripheral part, and annular axially extending inner and outer reverse curved portions between said flat central part and said outer flat part, the inner curved portion directly adjoining said central part extending to one side of the plane thereof and the other outer curved portion extending therefrom to the other side of the plane of the central part, the disk being provided at its periphery with an annular rim crossing the plane of said central part and having a tire supporting flange at one side thereof, the outer curved portion of the disk and the annular rim joining the outer flat part in gradual curves.

JOHN R. WINTER.